Patented Feb. 26, 1929.

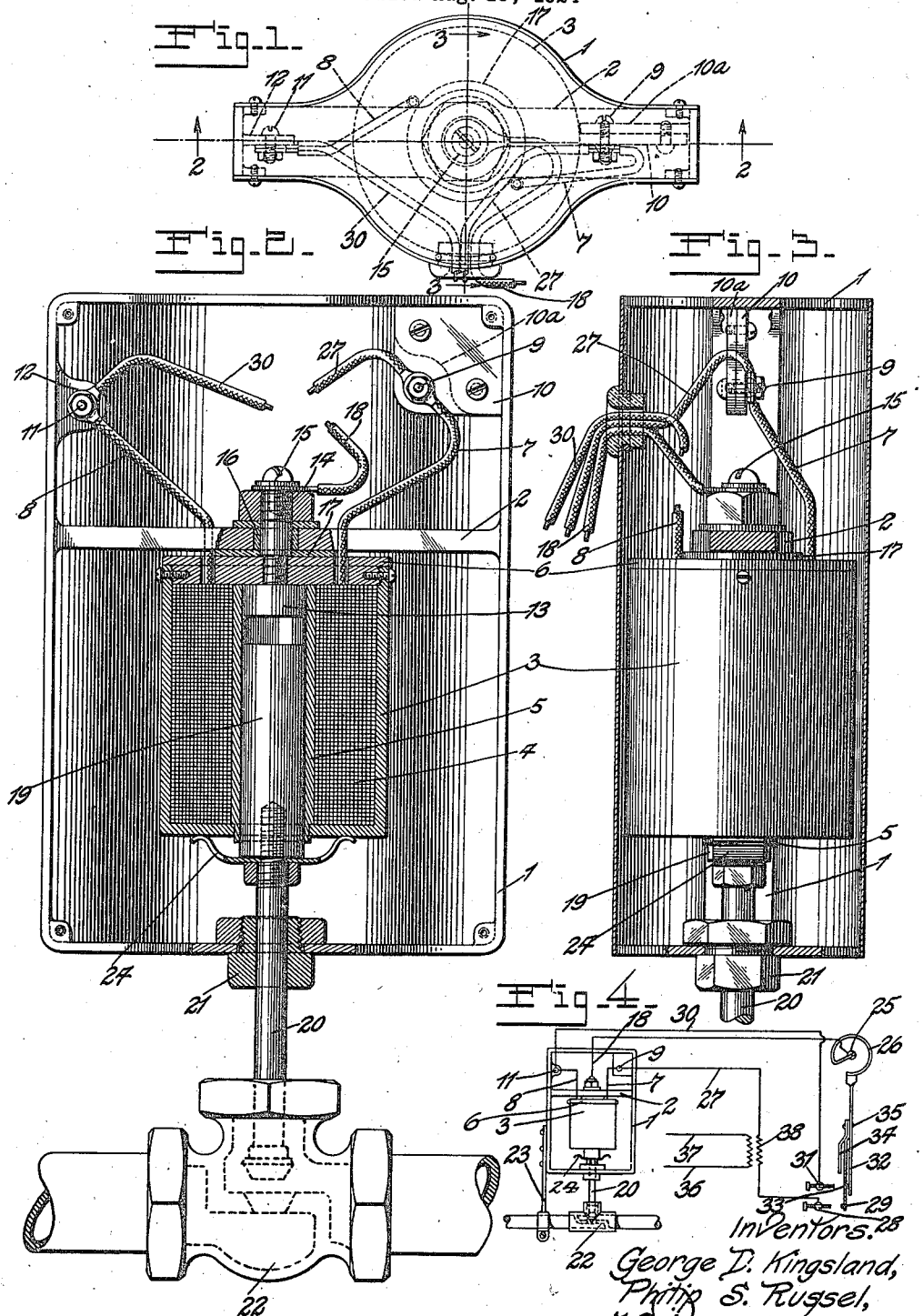

1,703,534

UNITED STATES PATENT OFFICE.

GEORGE D. KINGSLAND AND PHILIP S. RUSSEL. OF ST. LOUIS, MISSOURI.

APPARATUS FOR CONTROLLING TEMPERATURE.

Application filed August 18, 1924. Serial No. 732,849.

This invention relates to an apparatus for controlling temperature.

An object of the invention is to provide an actuator whereby an individual or a group of apparatus for effecting temperature changes are directly controlled to place said apparatus in operation upon a predetermined temperature variation, and to maintain operation thereof between predetermined temperature limits.

Another object of the invention is to associate an actuator for controlling apparatus for effecting temperature changes with a thermostatic control that opens and closes controlling circuits for the actuator, whereby a temperature rise or fall to a predetermined temperature point will actuate said mechanism and said actuator will maintain its position for an inverse temperature rise or fall within said predetermined temperature limits.

Another object of the invention is to provide an actuator of a solenoid type with means whereby the same may be actuated on a low direct or alternating current, with means for preventing vibration in the solenoid when operated by an alternating current.

Additional advantages of the construction will be apparent from the following detailed description taken in connection with the accompanying drawings, in which Fig. 1 is a plan view of the actuator case.

Fig. 2 is a vertical section on the line 2—2 of Fig. 1.

Fig. 3 is a vertical section on the line 3—3 of Fig. 1.

Fig. 4 is a diagrammatic view illustrating the thermostat, actuator and the electrical controls therefor.

The device of the present invention has particular application to the direct control of the apparatus for effecting temperature changes, and may be applied to either steam, hot water or hot air heating apparatus as well as refrigerating devices. In the ordinary thermostatic control certain currents are set up in the thermostatic element that heat the same independently of the temperature surrounding the thermostat. This fact accounts for an artificial making and breaking of the current controlled by the thermostat and results in inaccurate operation of the devices. Furthermore, the thermostat itself is subject to vibration that artificially makes and breaks currents controlled thereby, preventing a direct response of the apparatus for effecting temperature changes. Again, the thermostat is subject to temperature variations due to air currents that do not properly respond to the mean temperature of the room. This causes fluctuation of the circuit breakers at a fixed critical temperature.

The device of the present invention accomplishes broadly the operation of an actuator for placing in operation either a heating or cooling apparatus at a predetermined temperature point, and maintaining the operative condition of the apparatus during a drop or rise of temperature within a predetermined range. This is accomplished by the association of a thermostat, electric circuits controlling a solenoid actuator and a dual-acting circuit breaker. The device as illustrated in the drawing is shown applied to a steam or hot water valve, but it is obvious that it can also be applied for operating the register shutters of a hot air heating system, or for controlling a refrigerating device.

The structure comprises a housing 1 having a transverse supporting rib 2. Upon the rib 2 and within the housing 1 is mounted a metallic solenoid case 3 which therefore has electrical conductivity. The solenoid coil or winding 4 is wound upon a spool 5 of insulating material and is insulated from the case. The solenoid case is provided with a cover 6 through which project two leads 7 and 8 from the solenoid winding. The lead 7 terminates at a binding post 9 carried by an insulated block 10 mounted on a lug 10ª fitted in the upper part of the housing. The lead 8 terminates at a binding post 11 carried by a lug 12 of metal formed at the side of the housing and is therefore in electrical connection with the housing. Within the spool 5 is a magnetic element 13 of the solenoid, and a pin 14 extends upwardly from said element terminating in a binding post 15. The pin 14 is insulated from the rib 2 by an insulating bushing 16, and the top of the solenoid case is insulated from the rib by an insulating member 17. Connected to the binding post 15 is a lead 18. The armature 19 of the solenoid operates in the spool 5 and has attached to its lower end a stem 20 passing through a bushing 21 in the bottom of the housing 1.

The armature 19 with its stem 20 constitutes the actuator for operating the control for the apparatus for effecting temperature change.

In the embodiment of the invention illustrated in the drawing the stem 20 is the valve stem of a valve 22. Obviously, the stem 20 may be connected with any other form of apparatus control such, for instance, as the shutters of a register of a hot air furnace. When the armature is in the up position, illustrated in Fig. 2 of the drawing, the valve device is open, permitting the passage of the fluid to the apparatus (not shown).

Any suitable means of support for the housing 1 may be provided and, as illustrated diagrammatically in Fig. 4, a bracket 23 is provided.

Between the end of the stem 20 and the matching face of the armature 19 is a double leaf spring 24 which when the armature is in raised position contacts with the bottom face of the solenoid case, affording means for electrically connecting the housing 1 to the terminal 15, through the case 3, and also providing means to prevent the hammering action due to vibration of the armature in the solenoid when the solenoid is under the influence of alternating current.

The lead 18 terminates in a binding post 25 that is electrically connected with a bimetallic curved plate 26 constituting the thermostatic element for operating a double circuit closer. The lead 7 is connected at the binding post 9 with a lead 27 that terminates at a contact screw 28 adjustably arranged for contact with one plate 29 of the double circuit breaker. The lead 8 is electrically connected at the binding post 11 with the lead 30 that terminates at an adjustable contact screw 31 that is arranged for adjustable contact with the second contact plate 32 of the circuit breaker, the contact plate 29 being arranged with an opening 33 therethrough in alinement with the end of the adjustable contact screw 31 so that the end of said screw 31 projects therethrough and makes contact directly with the contact plate 32. The contact plate 32 constitutes an arm connected with the free end of the curved thermostatic member and the contact plate 29 is secured thereto together with a stiffening spring 34 by a pin 35.

The circuits are energized by energizing leads 36 and 37 that are electrically connected with the lead 27 by a transformer 38.

The operation of the device is as follows. Assuming that the solenoid is not energized the armature 19 thereof is in a lowered position in which the spring 24 is out of contact with the solenoid case, that is to say the armature is lowered from the position shown in Fig. 2. In this position the double circuit breaker is open and is in the position shown in the diagram in Fig. 4. As the temperature of the medium surrounding the thermostat is decreased the arm carrying the contact plates 29 and 32 is swung inwardly until the adjustable contact screw 31 projects through the opening 33 and contacts with the contact plate 32, prior to which the adjustable contact screw 28 has contacted with the contact plate 29. This closes the circuit through the leads 8 and 30 and through the leads 7 and 27, thereby energizing the solenoid. By reference to the diagram shown in Fig. 4 of the drawing the course of the current when the circuit is closed will be understood as follows: The primary of the transformer 38 is energized by the power leads 36 and 37 thereby energizing the secondary of the transformer which is in circuit with the lead 27 and the lead 7, the lead 7 being connected with the winding of the solenoid. The opposite end of the winding of the solenoid is connected with the lead 8 in circuit with the lead 30 terminating at the contact point 31. When the circuit is closed by operation of the thermostatic device, as above described, the circuit is closed across the members 28 and 31, the member 28 being connected with the secondary of the transformer. As soon as the solenoid is energized the armature 19 is raised, actuating the apparatus for effecting temperature control to open position and bringing the contact spring 24 into contact with the solenoid case, thereby establishing a second circuit. The course of the current of the second circuit may be understood by reference to the diagram. The circuit is energized by the transformer 38 through the leads 27 and 7, and passes through the winding of the solenoid, and thence through the lead 8 which is in electrical contact with the housing 1. The current then flows through the housing and the stem 20, thence through the spring 24 to the solenoid case 3, across the cover 6 thereof, and through the pin 14 to the binding post 15. The lead 18 is connected with the binding post 15, and the current continues through the lead 18 to the terminal 25, then through the thermostat 26, the plate 32 and the contact 29 to the contact 28, and then back to the transformer.

The device is settable so that the actuator, comprising the armature 19 and the stem 20, is operated at a predetermined temperature. When the temperature of the medium surrounding the thermostat has raised to a predetermined degree the contact 32 first breaks contact with the contact screw 31, breaking the first circuit. Since, however, a second circuit has been established, as above described, the solenoid will remain energized during a predetermined further rise in temperature and until the temperature has reached the maximum temperature for which the instrument is set, which temperature is sufficient to break the contact between the adjustable contact members 28 and 29.

We are aware that the invention may be varied in certain particulars without departing from the spirit and scope thereof. We do not limit ourselves unessentially to the exact details shown and described.

What we claim and desire to secure by Letters Patent is:—

1. In a device of the class described, a solenoid comprising a winding and a movable armature, a plurality of circuits for energizing said winding, a thermostatic device for controlling said circuits, and a contact member in connection with the armature operable incidental to the movement of the armature for affecting one of said circuits.

2. In a device of the class described, an actuator, electrical means for operating said actuator, circuits controlling said means, circuit breakers in connection with said circuits operable to energize said means and to open and close said circuits, and a thermostatic device for operating said circuit breakers whereby said means are energized at a predetermined temperature and remain energized during a predetermined variation in temperature.

3. In a device of the class described, an actuator, electrical means for operating said actuator, a pair of circuits controlling said means, circuit breakers in connection with said circuits, and an actuating device for said circuit breakers whereby said circuit breakers are closed under a predetermined influence and whereby one of said circuits remains closed after the other thereof has been opened.

4. A device of the class described comprising in combination a control for an apparatus for effecting temperature control, an actuator for said control, a solenoid for operating said actuator, electrical means for energizing said solenoid comprising a pair of circuits, and means for simultaneously closing said circuits and for separately opening said circuits.

5. In a device of the class described, a solenoid comprising a solenoid winding, a pair of electrical circuits for energizing said winding, a movable armature, a device in connection with said armature, said device constituting an electrical contact member for one of said circuits and also for stabilizing the armature when the solenoid is under the influence of alternating current.

6. A device of the class described comprising an electromagnetic device including an electrical winding, a member responsive to the energizing of said winding, a circuit for energizing said winding, a second circuit for energizing said winding, a connection in said second circuit operable as an incident to the energizing of said winding to establish said second circuit, and means for opening the first circuit without opening said second circuit.

GEORGE D. KINGSLAND.
PHILIP S. RUSSEL.